Oct. 21, 1930.                W. S. TOWNSEND                1,778,738
                          LIQUID DISPENSING MECHANISM
                             Filed July 17, 1925
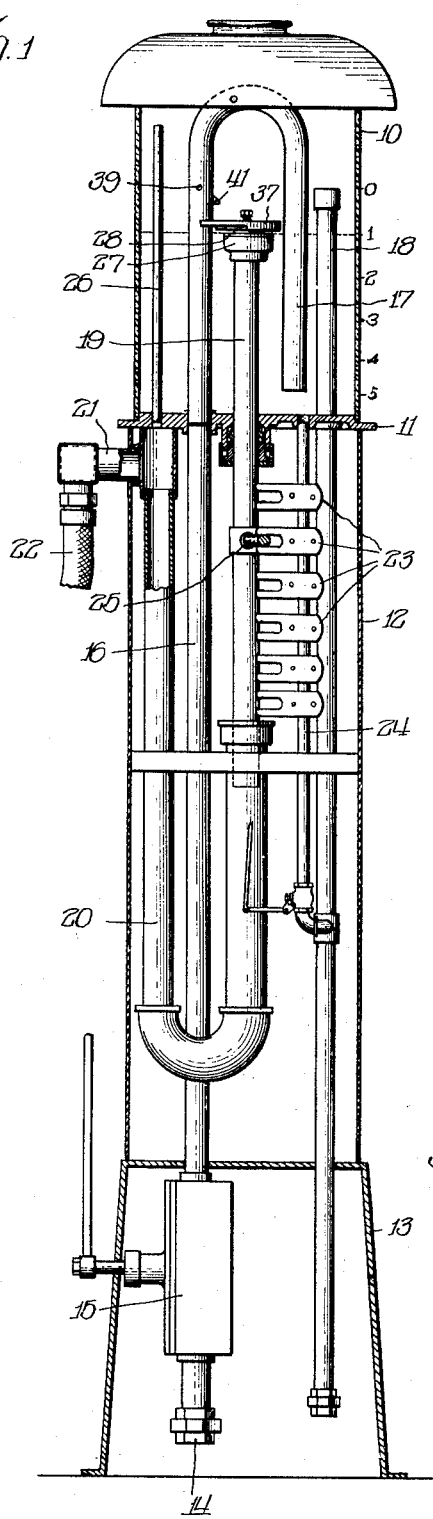
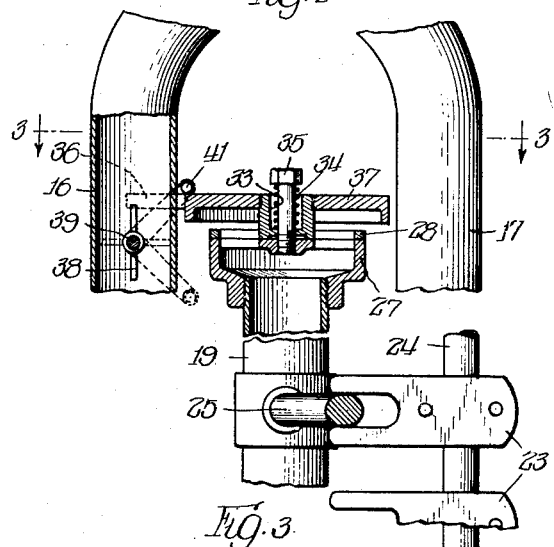
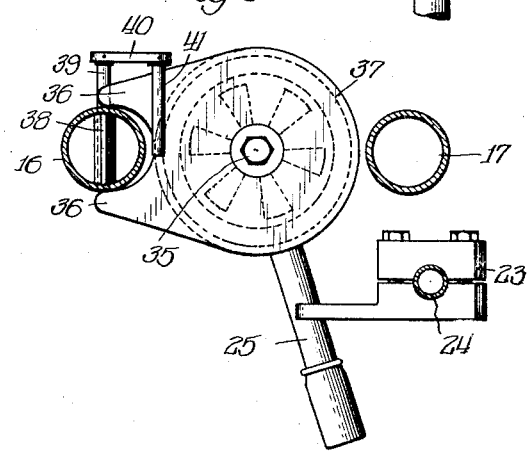
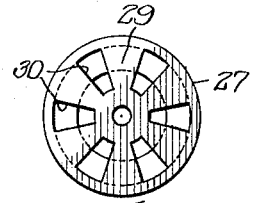
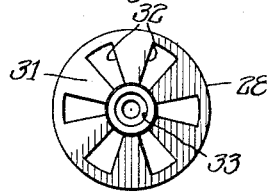
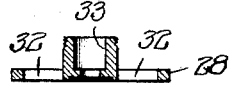
Witness:
P. Burkhardt.
Inventor:
William S. Townsend,
By Wilkinson, Huxley, Byron & Knight
                                      Attys.

Patented Oct. 21, 1930

1,778,738

UNITED STATES PATENT OFFICE

WILLIAM S. TOWNSEND, OF ROCHESTER, PENNSYLVANIA, ASSIGNOR, BY MESNE ASSIGNMENTS, TO THE WAYNE PUMP COMPANY, OF BALTIMORE, MARYLAND, A CORPORATION OF MARYLAND

LIQUID-DISPENSING MECHANISM

Application filed July 17, 1925. Serial No. 44,167.

This invention relates to liquid dispensing mechanism.

One object of the invention is to provide liquid dispensing mechanism with means whereby liquid cannot be trapped or otherwise disposed of to cheat a purchaser of liquid.

Another object is to provide liquid dispensing mechanism including a discharge conduit with means beyond the control of the operator whereby liquid which has passed into the discharge conduit and is not visible to the purchaser, is supplied to the purchaser so that he receives the entire indicated amount.

Another object is to provide liquid dispensing mechanism with simple and efficient means for preventing supply of liquid to a liquid measuring container except when the discharge conduit is in a predetermined position, thereby avoiding a variation in actual quantity of liquid in the measuring container, which would result if the discharge conduit were submerged and were permitted to be at different levels during the filling operation.

Another object of the invention is to provide liquid dispensing mechanism which is simple, reliable and efficient and is adapted generally to meet service requirements.

A further object is to provide a fluid dispensing apparatus having a measuring chamber or container provided with an inlet having means associated therewith to positively prevent siphonic action from said measuring chamber.

With these and various other objects in view, the invention consists of certain novel features of construction and operation as will be more fully described and particularly pointed out in the specifications, drawings and claims appended hereto.

In the drawings, wherein like reference characters are used to designate like parts—

Figure 1 is a vertical sectional view of liquid dispensing mechanism embodying my invention;

Figure 2 is an enlarged elevational view, parts being broken away, of various elements including valve mechanism forming a part of my invention;

Figure 3 is a sectional view taken substantially in the plane indicated by the line 3—3 of Figure 2;

Figures 4 and 5 are respectively a top plan view and a vertical sectional view of one of the valve members for controlling the discharge of liquid; and Figures 6 and 7 are respectively a top plan view and a vertical sectional view of an associated valve member.

The various novel features of the invention will be apparent from the following description and drawings and will be particularly pointed out in the appended claims.

Referring to the figures of the drawings it will be noted that my invention is illustrated in connection with liquid dispensing mechanism including a transparent measuring container 10 provided with marks for indicating the number of gallons of liquid in the container. Said measuring container 10 is mounted upon a base plate 11, supported upon a casing 12, in turn mounted upon a base member 13. Liquids, such as gasoline and the like are forced from any suitable source indicated generally by reference character 14, by a pump 15 up through a supply pipe 16, which extends through the base plate 11 and terminates in a U-shaped portion 17 within the measuring container 10. A stationary overflow pipe 18 extends through said base plate 11 into measuring chamber 10 and is set in this particular instance so that any excess over five gallons within the measuring chamber 10 will overflow down through the overflow pipe 18 back to the source of supply. A discharge or service conduit 19 also extends through the base plate 11 and into the measuring container 10 and is vertically adjustable within said container 10, for determining the quantity of discharge from said measuring container 10 down through said discharge conduit 19, U-shaped well 20, outlet pipe 21 and service hose 22. The discharge conduit 19 not only is vertically movable within the measuring container 10, but also is telescopically arranged with respect to one of the legs of the well 20.

A plurality of recessed locking members 23, carried by a drain pipe 24, are provided for receiving and releasably locking a handle 25, secured to the discharge conduit 19. It is apparent, therefore, that the conduit may be adjusted by exerting raising or lowering pressure upon the handle 25 and the conduit locked in adjusted position by turning the handle 25 so that it passes into the recess of an associated locking member 23. A vent pipe 26 extends from the upper part of the well 20 to a point above the level of the liquid in the measuring container 10 to prevent siphoning of liquid from the well and out through the hose 22 below a pre-determined level determined by the lower wall of the outlet pipe 21.

As mentioned above, one object of this invention is to provide means whereby liquid cannot be trapped or otherwise disposed of to cheat a purchaser of liquid, or in this instance, to provide means beyond the control of the operator, whereby liquid which has passed into the discharge conduit and is not visible to the purchaser, is supplied to the purchaser so that he receives the entire indicated amount. In solving the problem, I have provided a valve at the upper end of the discharge conduit which normally is closed for preventing the discharge of fluid through said conduit but which may be opened at the proper time to permit the discharge of liquid. This valve comprises two valve members 27 and 28, the former of which is threaded onto the upper end of the discharge conduit 19 and has an upper flat disc 29 provided with a plurality of circumferentially spaced radially extending ports or openings 30. The other valve member 28 is provided with a cooperating flat disc 31 provided with corresponding circumferentially spaced radially extending openings 32. The upper valve member 28 is provided with a centrally arranged pocket 33 for the reception of a coil spring 34, which is coiled around a stud 35 which extends centrally through said pocket and is centrally secured to the plate 29 of the lower valve member 27 in a manner whereby the spring 34, which is interposed between the head of the stud 35 and the floor of pocket 33, yieldably presses the flat cooperating surfaces of the two valve members 27 and 28 into engagement with each other.

The ports or openings 30 and 32 in the valve members 27 and 28 respectively are not in register or, in other words, the valve is closed for preventing discharge of liquid from the measuring container 10 through said discharge conduit 19 when handle 25 is not locked in one of said recessed members 23. However, if it is desired to open the discharge valve or to bring the ports or openings 30 and 32 into register with each other for permitting discharge of liquid from the measuring container 10 through discharge conduit 19, such may be done by rotating the handle 25 in a counter-clockwise direction as viewed in Figure 3. By so doing, the conduit 19 is rotated and also the valve member 27 which is secured thereto. The upper valve member 28 is held stationary in so far as rotation is concerned, by two arms 36 which straddle the supply pipe 16, which arms are formed on a plate or cap 37 secured to the upper valve member 28.

As shown in Figure 1 there are four gallons of liquid in the container and the level of the liquid in the container is at the one gallon mark, the handle 25 being locked in a corresponding position with the discharge valve open; that is, with ports 30 and 32 in register for permitting the discharge of liquid from the measuring container 10 through the discharge conduit 19 until the liquid has lowered in the container 10 to a plane on a level with the upper surface of the disc portion 31 of valve member 28. In view of the fact that the open end of the overflow pipe is located at a point within the measuring container 10 to permit five gallons of liquid to be received within the container, it is apparent that one gallon of liquid has been discharged from the container 10 through the discharge conduit 19. If it is now desired to discharge another gallon of liquid from said container 10 through the discharge conduit 19, the handle 25 may be rotated in a clockwise direction as viewed in Figure 3, then lowered and moved into the recess of the next lower locking member 23, bringing the discharge valve down to the proper level and opening it for permitting the discharge of the second gallon. Accordingly, it will be appreciated that any amounts up to five gallons may be discharged at a time. Furthermore, by means of the arrangement thus far described, a purchaser can readily see the level of the liquid in the container before and after delivery through the discharge conduit 19 whereby he is assured of the full discharge of the measured liquid which he has purchased in view of the fact that there is no other valve in the discharge passageways. It will be appreciated that if there were a valve in the outlet pipe 21, for example, a column of liquid could be trapped in the discharge conduit 19 by closing said valve the instant the liquid lowered to the top of the discharge conduit 19 and of course, the purchaser would be none the wiser. However, with my arrangement, such dishonest practice cannot be accomplished.

Located in the upper end of the supply pipe 16, is an inlet control valve 38 which, as shown, is of the butterfly type, said valve being mounted upon a stem 39 pivoted in the walls of the supply pipe 16. Secured to the stem 39 at one end thereof, is an arm 40 which which a pin 41 which is adapted to be engaged by the cap 37 carried at the upper end of discharge conduit 19. As shown in Figure 2 of the drawings, the discharge conduit has been elevated to the extent that the cap 37 has engaged the pin 41 and raised it for opening the valve 38, as indicated in full lines, for permitting the flow of liquid through supply pipe 16 and into the measuring container 10. It will be understood, however, that when valve 38 is in open position, the discharge control valve 27—28 will be in closed position and not in open position as shown in Figures 2 and 3, the valve 27—28 being shown open merely to illustrate a locking position of handle 25. When, however, the conduit 19 is lowered for example, as shown in Figure 1, the cap 37 passes out of engagement with the pin 41 and the valve, due to the weight of the pin 41 and arm 40, has moved into closed position as shown in dotted lines of Figure 2 for preventing further supply of liquid through said pipe 16 to the measuring container 10. Accordingly, the valve 38 forms means for preventing the supply of liquid to said container when the movable discharge conduit 19, and more particularly, the discharge control valve and the cap 37 are below a certain predetermined level. The position of the supply control valve 38 is controlled by the position of the conduit 19 within the measuring container 10. It will readily be appreciated that due to the fact that the valve 38 is open only when the liquid is being supplied to the measuring container and at all other times (during idle position or discharge) that said valve is closed, this will positively act to prevent any siphonic action through the inlet pipe 17 and back to the supply reservoir when the pump is not in operation. The measuring container 10 can be filled only when the discharge conduit 19 is raised a certain predetermined amount into a position which may be called the fill position, in which position the supply control valve 38 is held open. In view of the fact that said supply control valve 38 is completely encased by the container 10, said valve cannot be operated manually except through the medium of the discharge conduit 19 and the associate discharge control valve. This arrangement eliminates the possibility of inaccuracy of measure which otherwise might result from filling the measuring container 10 when the discharge conduit 19 is below the so-called fill position. In other words, if the valve 38 could be opened when the discharge conduit 19 is lowered its maximum amount, a greater quantity of liquid could be passed into the measuring container than could be if the discharge conduit 19 were at a higher level with valve 38 in open position because the conduit 19 in the first instance would displace less liquid.

It is to be understood that I do not wish to be limited by the exact embodiment of the device shown as it will be readily appreciated that other and various embodiments will be apparent to those skilled in the art.

I claim:

1. In liquid dispensing mechanism, the combination of a measuring container, means for supplying liquid thereto, a vertically adjustable discharge conduit for predetermining the quantity of discharge from said container, and means carried by said discharge conduit for normally preventing passage of liquid from said container into said conduit and whereby the level of the liquid in said container after delivery therefrom properly indicates the full discharge of the measured liquid.

2. In liquid dispensing mechanism, the combination of a measuring container, means for supplying liquid thereto, a discharge conduit for selectively predetermining quantities of liquid to be dispensed from said container, and a valve secured to and carried by said conduit for normally preventing passage of liquid from said container into said conduit and whereby the level of the liquid in said container after delivery therefrom properly indicates the full discharge of the measured liquid.

3. In liquid dispensing mechanism, the combination of a measuring container, means for supplying liquid thereto, a vertically adjustable discharge conduit for predetermining the quantity of discharge from said container, and means carried by said conduit for controlling the passage of liquid from said container into said conduit.

4. In liquid dispensing mechanism, the combination of a measuring container, means for supplying liquid thereto, a vertically movably mounted conduit for predetermining the quantity of discharge from said container, valve means for controlling the passage of liquid through said conduit, and means whereby a rotary movement of said conduit will control said valve means.

5. In liquid dispensing mechanism, the combination of a measuring container, means for supplying liquid thereto, a vertically adjustable rotatably mounted discharge conduit, a valve carried by said conduit for controlling the passage of liquid therethrough, and means for changing the vertical position of said conduit for determining the quantity of liquid to be discharged and for rotating said conduit for controlling said valve and the discharge of liquid through said conduit.

6. In liquid dispensing mechanism, the combination of a measuring container, means for supplying liquid thereto, a vertically adjustable rotatably mounted discharge conduit extending into said container, a valve carried by said conduit for controlling the passage of liquid therethrough, means for changing the vertical position of said conduit for determining the quantity of liquid to be discharged and for rotating said conduit for controlling said valve and the discharge of liquid through said conduit, and means for locking said conduit in adjusted position.

7. In liquid dispensing mechanism, the combination of a measuring container, means for supplying liquid thereto, a vertically movably mounted discharge conduit extending in said container for predetermining the quantity of discharge through said conduit, a valve secured to and carried by said conduit for controlling passage of liquid from said container into said conduit, and means whereby the level of the liquid in said container after delivery therefrom properly indicates the full discharge of the measured liquid.

8. In liquid dispensing mechanism, the combination of a measuring container, means for supplying liquid thereto, a discharge conduit for predetermining the quantity of discharge from said container, and valved means dependent upon the position of said discharge conduit for controlling the supply of liquid.

9. In liquid dispensing mechanism, the combination of a measuring container, means for supplying liquid thereto, a discharge conduit, means actuated by said conduit for predetermining the quantity of discharge of liquid from said container, and means operated by said predetermining means for preventing the supply of liquid to said container except when said predetermining means is in a predetermined position.

10. In liquid dispensing mechanism, the combination of a measuring container, a pipe through which liquid may be supplied thereto, an inlet control valve for controlling the supply of liquid through said pipe, a movably mounted discharge conduit having a valve through which liquid may be discharged from said container, and means controlled by the position of said discharge conduit actuating said valves.

11. In liquid dispensing mechanism, the combination of a measuring container, a pipe through which liquid may be supplied thereto, an inlet control valve mounted in said supply pipe for controlling the supply of liquid through said pipe, a movably mounted discharge conduit having a valve through which liquid may be discharged from said container, and means controlled by the position of said discharge conduit actuating said valves.

12. In liquid dispensing mechanism, the combination of a measuring container, a pipe extending into said container and through which liquid may be supplied thereto, a valve mounted in said supply pipe, a movably mounted discharge conduit extending into said container, and means whereby said valve may be moved into an open position by said discharge conduit when said discharge conduit is raised to a predetermined amount.

13. In liquid dispensing mechanism, the combination of a measuring container, a pipe extending into said container and through which liquid may be supplied thereto, a valve mounted in said supply pipe, a movably mounted discharge conduit extending into said container, and means whereby said valve will close when said discharge conduit is lowered a predetermined amount from a given position.

14. In liquid dispensing mechanism, the combination of a measuring container, a pipe extending into said container and through which liquid may be supplied thereto, a valve mounted in said supply pipe, a movably mounted discharge conduit extending into said container, means whereby said valve is moved into an open position when said discharge conduit is raised a predetermined amount, and means whereby said valve will close when said discharge conduit is lowered a predetermined amount from a given position.

15. In dispensing apparatus, the combination of a measuring chamber, supply and discharge means therefor, valves in said supply and discharge means, said valves adapted to be opened only at predetermined positions of said means.

16. In liquid dispensing mechanism, the combination of a measuring container, a liquid supply pipe extending thereinto, a movably mounted discharge conduit extending into said container, a valve secured to and carried by said conduit within said container for controlling passage of liquid through said conduit at any position of said conduit, said valve comprising two valve members secured to said conduit and movable therewith, one of which is movable with respect to said conduit, and the other valve member of which is stationary with respect to said conduit.

17. In liquid dispensing mechanism, the combination of a measuring container, a liquid supply pipe extending thereinto, a movably mounted discharge conduit extending into said container, a valve carried by said conduit within said container for controlling passage of liquid through said conduit, said valve comprising two valve members, one of which is movable with respect to said conduit and non-rotatable with respect to said supply pipe, and the other valve member of which is stationary with respect to said conduit and rotatable with respect to said supply pipe.

18. In liquid dispensing mechanism, the combination of a measuring container, a liquid supply pipe extending thereinto, a movably mounted discharge conduit extending into said container, a valve carried by said conduit within said container for controlling passage of liquid through said conduit, said valve comprising two valve members, one of which is movable with respect to said conduit and non-rotatable with respect to said supply pipe, and the other valve member of which is stationary with respect to said conduit and rotatable with respect to said supply pipe, and means controlled by the position of said discharge conduit for controlling the supply of liquid to said container.

19. In liquid dispensing mechanism, the combination of a measuring container, a pipe through which liquid may be supplied thereto, a valve in said supply pipe for controlling the supply of liquid to said container through said pipe, a movably mounted discharge conduit through which liquid may be discharged from said container, a valve in said conduit controlling the flow of liquid therethrough, means on said discharge conduit for actuating said valve in said supply pipe at a predetermined position of said conduit, and means on said conduit actuating said valve in said discharge conduit at predetermined positions of said conduit.

20. In fluid dispensing apparatus, the combination of a measuring container, a stationary fill pipe extending into said container for supplying liquid thereto, and means in a part of said fill pipe within said container controllable externally of said container for preventing siphoning of fluid from said container and permitting filling of said container.

Signed at Rochester, Penna., this 13th day of July, 1925.

WILLIAM S. TOWNSEND.